United States Patent [19]
von Kaler

[11] Patent Number: 5,211,067
[45] Date of Patent: May 18, 1993

[54] TWO PART SHIFTER SHAFT

[75] Inventor: Roland L. von Kaler, Tecumseh, Mich.

[73] Assignee: Tecumseh Products Company, Tecumseh, Mich.

[21] Appl. No.: 847,929

[22] Filed: Mar. 6, 1992

[51] Int. Cl.⁵ .............................................. F16H 3/08
[52] U.S. Cl. ...................................................... 74/371
[58] Field of Search ................................. 74/371, 372

[56] References Cited

U.S. PATENT DOCUMENTS

| | | | |
|---|---|---|---|
| 4,809,560 | 3/1989 | Nemoto | 74/371 |
| 4,841,794 | 6/1989 | Hikishima | 74/371 |
| 4,932,278 | 6/1990 | Nemoto | 74/371 |
| 4,966,574 | 10/1990 | von Kaler | 475/206 |

Primary Examiner—Dirk Wright
Attorney, Agent, or Firm—Baker & Daniels

[57] ABSTRACT

The present invention is a transmission having a two part shift shaft. The spur gear supporting portion of the shift shaft is received by bearings of the housing at its two ends and is made of a relatively strong material for supporting the load of the spur gears. One of the bearings is formed in an internal wall of the housing to support the proximal end of the shift shaft. The shift collar supporting portion of the shift shaft supports the shift collar and is axially aligned with the gear supporting portion. A projection of the shift collar supporting portion engages a recess in the gear supporting portion to axially align and properly position the shift collar for operation of the shifting mechanism. The shift collar supporting portion is made of a less expensive material than the gear supporting portion, thus reducing the overall cost of the transmission.

21 Claims, 2 Drawing Sheets

TWO PART SHIFTER SHAFT

BACKGROUND OF THE INVENTION

1. Field of the Invention

The present invention relates to small transmissions such as used in riding lawn mowers and the like. More specifically, the field of the invention is that of shift shafts for such in-line transmissions.

2. Prior Art

In-line shift transmissions include a plurality of linked transmission shafts, with one of the shafts being a shift shaft supporting a plurality of rotatable spur gears. The transmission housing includes bearings which support the shift shaft at its opposite ends. The shift shaft includes axial channels in which keys are disposed for engaging internal keyways of the rotatable spur gears and thereby rotatably connecting the engaged spur gear to the output shaft. The key is made of a resilient metal including an elongate shaft disposed in the axial channel of the shift shaft and a head portion which is biased to extend into one of the keyways.

An in-line transmission is disclosed in U.S. Pat. No. 4,996,574, assigned to assignee of the present invention, the disclosure of which is explicitly incorporated by reference. The shifting mechanism of the '574 transmission includes a pair of axially movable shift keys disposed in the longitudinal channels of the shift shaft. The shift keys rotatably couple the shift shaft with one of the gears. Each key has a base portion engaging a shift collar which is axially slidable on the shift shaft. The collar has a peripheral groove receiving a pin of a shift fork, which can pivot within the housing and is connected to the shifting mechanism of the vehicle. The shift collar may be axially moved along a portion of the shift shaft by the pivoting action of the shift fork. The spur gears are disposed on a second portion of the shift shaft, and the resilient keys extend from the shift collar on the first portion of the shift shaft to engage a keyway of a spur gear on the second portion of the shift shaft.

The shift fork, pin, and annular groove permit the collar, and hence the keys, to be moved axially while the keys are at the same time rotating with the shift shaft. Each of the spur gears journalled on the shift shaft has on its inner circumference four circumferentially spaced keyways which may be engaged by the keys to rotatably couple the shift shaft with the selected spur gear. Consequently, as the keys are moved axially by the shift collar, the key heads successively engage and disengage keyways of adjacent spur gears, thereby coupling each spur gear to the shift shaft sequentially one at a time.

In order to provide the several shifting positions in the transmission disclosed in the aforementioned U.S. Pat. No. 4,996,574, the shift shaft extends across the length of the transmission housing. Further, in order to support the loading of the gears, the shift shaft must be made of material, for example steel, capable of withstanding the high loading forces from the transmission gears. However, the strong material which comprises the shift shaft is relatively expensive, thus increasing the cost of an in-line transmission.

In one known transmission, one section of the steel shift shaft has a reduced diameter and is fitted with a plastic sleeve which defines the axial channel around the reduced diameter portion of the steel shift shaft. This arrangement reduces the amount of steel required to make the shift shaft while still providing a seating for the collar and an axial channel for positioning the keys. However, the shift shaft still must extend across the length of the transmission housing which requires almost as much steel material as single piece shift shafts. Therefore, further reduction in the amount of steel material in the shift shaft is desirable.

What is needed is a less costly shift shaft for a transmission.

Also needed is such a shift shaft which reduces the amount of steel material without impairing the functionality of the shift shaft.

SUMMARY OF THE INVENTION

The present invention is a transmission having a shift shaft made of two separate portions, so that one portion of the shaft may be made of less expensive material. The spur gear supporting portion of the shift shaft is made from conventional material such as steel to support the rotating spur gears. However, the shift collar supporting portion of the shift shaft is made from less expensive material such as plastic because it is only subject to loading from the shift collar.

The housing of the transmission includes an additional bearing for receiving the middle of the shift shaft at one end of the spur gear supporting portion. With this arrangement, the loading of the spur gear supporting portion is supported by housing bearings at both its ends, while the shift collar supporting portion is connected in axial alignment with the spur gear supporting portion of the shift shaft to provide adequate support for the loading of the shift collar.

The shift keys of the transmission extend from the shift collar to the gear supporting portion of the shift shaft. A base portion at one end of the shift key engages the shift collar, and a shaft portion of the shift key extends from the base through an axial channel in the shift shaft. The key head extends from the other end of the shift key and is adapted to engage the keyways of the gears. The shaft portion is made of a resilient metal so that the key head is biased into the keyway, while the base portion is keyed to the shift collar for axial movement.

The two largest sections of the shift shaft are the shift collar supporting portion and the spur gear supporting portion. The diameter of these sections are larger than the remainder of the shift shaft in order to provide the axial channel which houses the shift key of the in-line shifting mechanism. The axial channel is at least twice as long as the shift collar supporting portion, although only about half of the shaft defining the axial channel actually supports spur gears. Therefore, the application of the invention to an in-line transmission shift shaft significantly reduces the material cost of the axial channel defining portion of the shift shaft without impairing its utility.

The present invention, in one form, is a transmission comprising a housing, a plurality of shafts rotatably disposed within said housing, a shifting mechanism, and a supporting structure. One of the plurality or shafts is a shift shaft supporting a plurality of gears. The shifting mechanism selectively engages one of the gears disposed on the shift shaft. The supporting structure retains the shift shaft within the housing. The shift shaft comprises a first and second shift shaft portion. The first shift-shaft portion consists essentially of a first material which supports the plurality of gears, and the second shift shaft portion consists essentially of a second material which supports the shifting mechanism. The first material is more expensive than the second material so that the cost of the shift shaft is reduced in comparison to prior art shift shafts.

One object of the present invention is to provide a less costly shift shaft for a transmission.

Also an object is to provide such a shift shaft which reduces the amount of steel material without impairing the functionality of the shift shaft.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
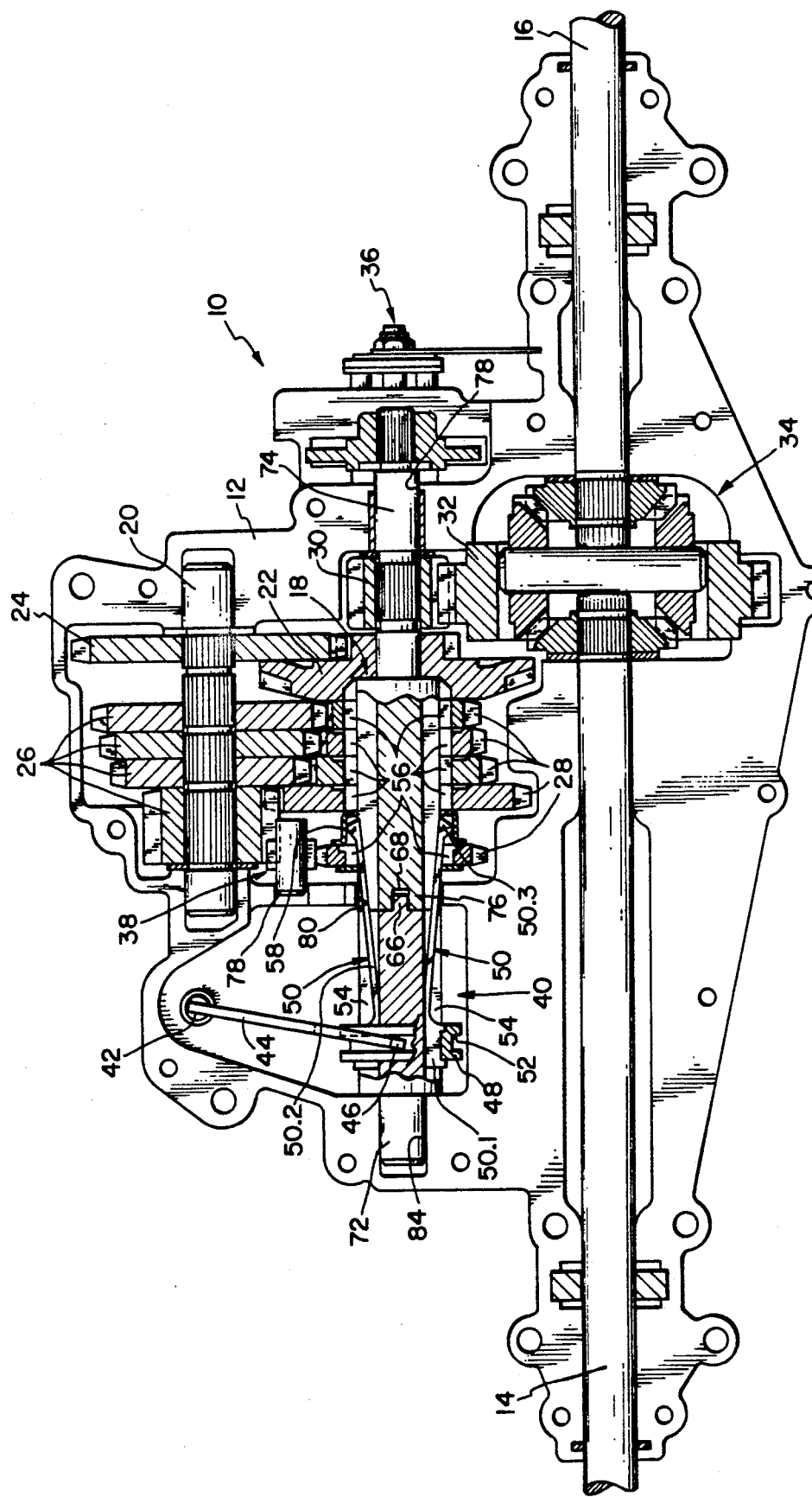
FIG. 1 is top view, in partial cross-section, of the transmission of the present invention.

The present invention relates to transaxle 10 as shown in FIG. 1. Lower housing 12 together with an upper housing (not shown) rotatably supports axles 14 and 16, shift shaft 18, and counter shaft 20. An input shaft (not shown) turns input bevel gear 22 which is freely rotatable about shift shaft 18 and engaged with gear 24 of counter shaft 20. Companion gears 26 of counter shaft 20 engage spur gears 28 of shift shaft 18 so that gear 30 of shift shaft 18 drives ring gear 32 of differential 34 and thereby turns axles 14 and 16 in a forward direction. In addition, transaxle 10 may be slowed or stopped by operation of brake assembly 36. A reverse gear may be provided by stub shaft and gear 38 being disposed between one of companion gears 26 and one of spur gears 28.

The transmission gear ratio of transaxle 10 is determined by shifting mechanism 40 which includes shift input shaft 42, shifter fork 44, pin 46, collar 48, and keys 50. Shift input shaft 42 is connected in a known manner to linkage (not shown) of the vehicle which allows the vehicle operator to change gears manually. Shifter fork 44 is pivotally connected with shift input shaft 42 and includes pin 46 which extends into annular groove 52 of collar 48. Collar 48 is disposed and slidably axially movable on shift shaft 18 and is operably engaged with base portions 50.1 of keys 50. Shafts portions 50.2 of keys 50 are disposed within annual channel 54 of shift shaft 18 and include outwardly extending head portions 50.3. The head portions 50.3 may selectively engage gear keyways 56 which are internal recesses in spur gears 28. The selective engagement of heads 50.3 with keyways 56 provide the operator selectable forward and reverse gear ratios of transaxle 10. Neutral sleeve 58 provides an axial position within shift shaft 18 wherein keys 50 do not engage any keyway 56. Alternatively, neutral sleeve 58 may include an internal recess to provide an engagable neutral position.

Figure 2:
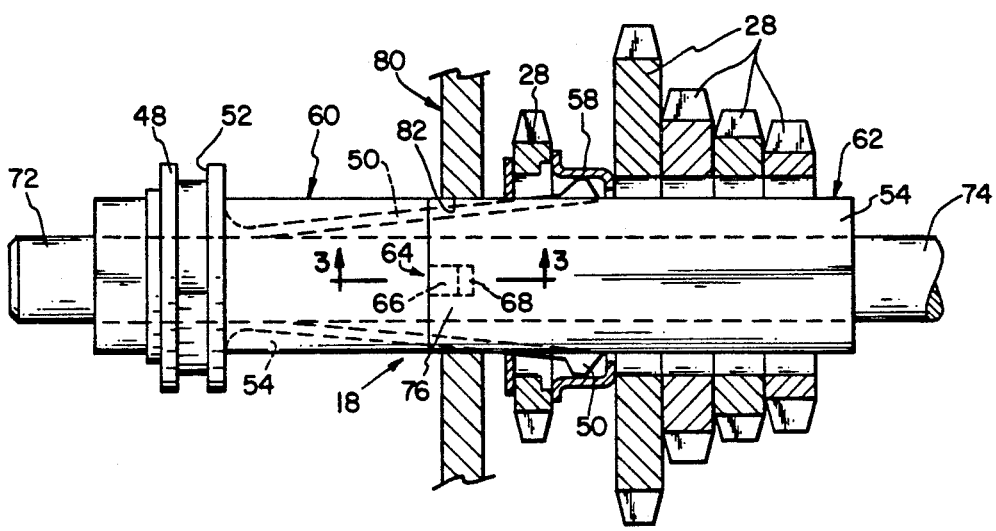
FIG. 2 is an enlarged top view of the connection of the two halves of the shifter shaft.
Figure 3:
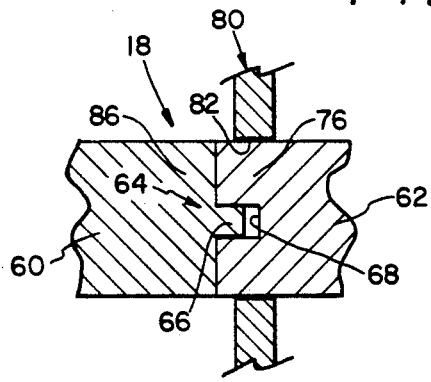
FIG. 3 is a cross-sectional view taken along view lines 3—3 of FIG. 2.
Figure 4:
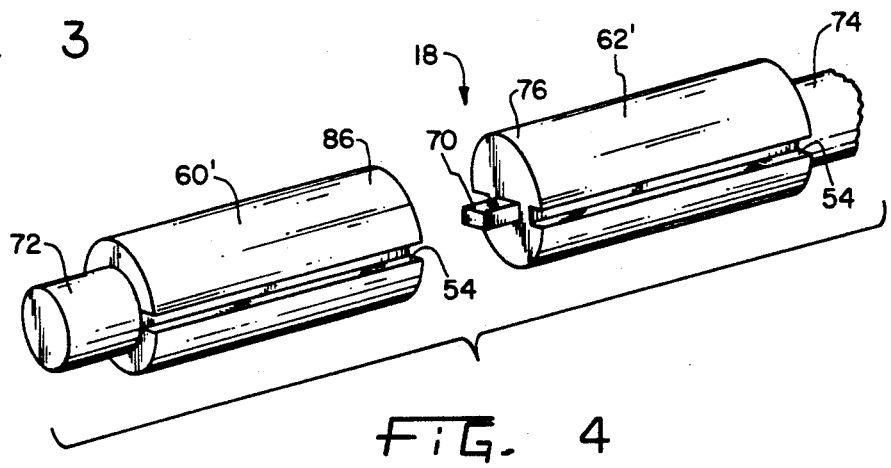
FIG. 4 is a perspective view of the two part shift shaft of the present invention.

In accordance with the present invention, shift shaft 18 includes two distinct and independent axial portions 60 and 62 having an axial connection 64. Shift collar supporting portion 60 is made of a relatively lighter material, for example a plastic material, which is less expensive than the material of spur gear supporting portion 62, for example steel. Also, the material of spur gear supporting portion 62 is relatively smooth to facilitate the axial movement of shift collar 48. Axial connection 64 may include projection 66 of shift collar supporting portion 60 being received in recess 68 of spur gear supporting portion 62 (as shown in FIGS. 1-3), or projection 70 of spur gear supporting portion 62' being received in a recess (not shown in FIG. 4) of shift collar supporting portion 60' (as shown in FIG. 4). Shift shaft 18 is conventionally supported by the housing of transaxle 10 at distal ends 72 and 74 of portions 60 and 62, respectively, and shift shaft 18 is additionally supported at an intermediate position at proximal end 76 of spur gear supporting portion 62.

In order to support spur gears 28, input gear 22, and gear 18, portion 62 requires bearings which are formed in the transmission housing. Distal end 74 is supported in bearing 78 of lower housing 12 (and a corresponding bearing in the upper housing which is not shown) in a conventional arrangement. The housing in transaxle 10 further includes internal wall 80 in which bearing 82 is formed to receive proximal end 76 of spur gear supporting portion 62. Internal wall 80 may extend only partially across the transmission housing as shown in FIG. 1, or alternatively wall 80 may extend fully across the transmission housing. Bearings 78 and 82 rotatably support spur gear supporting portion 62 and are capable of absorbing the forces applied to spur gear supporting portion 62. Shift collar supporting portion 60 is supported at distal end 72 by bearing 84 in a conventional arrangement. Axial connection 64 provides sufficient support for proximal end 86 of shift collar supporting portion 60 because shift collar supporting portion 60 receives only the loading of shift collar 48, which is only a small fraction of the loading on spur gear supporting portion 62. Thus, bearings 78, 82, and 84 support shift shaft 18; and only bearing 82 requires additional material, namely the material of the transmission housing required to form internal wall 80.

In the preferred embodiment, shift collar supporting portion 60 is comprised of plastic materials such as nylon. Spur gear supporting portion 62 is preferably comprised of a durable material such as steel or SAE 1018, SAE 1117, and SAE 86L20H. Also, housing 12 is comprised of a soft material such as type 380 aluminum.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:
   a housing;
   an axle supported by said housing;

a plurality of shafts rotatably disposed within said housing, one of said shafts being a shift shaft defining an axial channel and having a plurality of gears disposed thereon, said plurality of shafts drivingly connected to said axle;

a key slidably disposed in said axial channel and adapted to engage one of said gears; and shifting means for axially moving said key within said axial channel and thereby selectively engaging one of said gears of said shift shaft;

said shift shaft comprising a first shaft axial portion, a second shaft axial portion, and means for axially connecting proximal ends of said first shaft portion and said second shaft portion, said first shaft portion consisting essentially of a first material and supporting said plurality of gears, said second shaft portion consisting essentially of a second material and supporting said shifting means, said second material being less durable than said first material whereby the cost of said shift shaft is reduced;

said shift shaft spaced apart and separate from said axle.

2. The transmission of claim 1 wherein said axially connecting means includes a recess in one of said first shaft portion proximal end and said second shaft portion proximal end, and a projection in the other of said first shaft portion proximal end and said second shaft portion proximal end, and said recess receives said projection whereby said first shaft portion and said second shaft portion are maintained in axial alignment.

3. The transmission of claim 1 wherein said first material consists essentially of steel and said second material consists essentially of plastic.

4. The transmission of claim 1 wherein said housing includes an internal wall having a bearing portion receiving said proximal end of said first shaft portion.

5. The transmission of claim 4 wherein said housing further includes second and third bearing portions receiving distal ends of said first shaft portion and said second shaft portion, respectively.

6. The transmission of claim 1 wherein said key includes an elongate shaft connecting a head and a base portion, said key head is disposed within said axial channel within said first shaft portion, and said key base portion is disposed within said axial channel within said second shaft portion.

7. The transmission of claim 6 wherein said shifting means includes a collar disposed on said second shaft portion and engaging said key base portion, said second shaft portion having a smooth outer surface so that said collar slidably engages said outer surface of said second shaft portion.

8. An in-line transmission comprising:
a housing having a bearing portion;
a plurality of shafts rotatably disposed within said housing, one of said shafts being a shift shaft defining an axial channel and having a plurality of gears disposed thereon;
a key slidably disposed in said axial channel and adapted to engage one of said gears; and
shifting means for axially moving said key within said axial channel and thereby selectively engaging one of said gears of said shift shaft;
said shift shaft comprising a first shaft portion and a second shaft portion, said first shaft portion having a proximal end axially connected to a proximal end of said second shaft portion, said bearing portion receiving and supporting said first shaft portion proximal end, said first shaft portion consisting essentially of a first material and said second shaft portion consisting essentially of a second material, said second material being less durable than said first material whereby the cost of said shift shaft is reduced.

9. The in-line transmission of claim 8 wherein one of said first shaft portion proximal end and said second shaft portion proximal end includes a recess, the other of said first shaft portion proximal end and said second shaft portion proximal end includes a projection, and said recess receives said projection whereby said first shaft portion and said second shaft portion are maintained in axial alignment.

10. The in-line transmission of claim 8 wherein said first shaft portion supports said plurality of gears and said second shaft portion supports said shifting means.

11. The in-line transmission of claim 8 wherein said first material consists essentially of steel and said second material consists essentially of plastic.

12. The in-line transmission of claim 8 wherein said housing includes an internal wall and said bearing portion is located in said internal wall.

13. The in-line transmission of claim 12 wherein said housing further includes second and third bearing portions receiving distal ends of said first shaft portion and said second shaft portion, respectively.

14. The in-line transmission of claim 8 wherein said key includes an elongate shaft connecting a head and a base portion, said key head is disposed in said axial channel within said first shaft portion, and said key base portion is disposed within said axial channel within said second shaft portion.

15. The in-line transmission of claim 14 wherein said shifting means includes a collar disposed on said second shaft portion and engaging said key base portion, said second shaft portion having a smooth outer surface so that said collar slidably engages said outer surface of said second shaft portion.

16. An in-line transmission comprising:
a housing including an internal wall with a bearing portion;
a plurality of shafts rotatably disposed within said housing, one of said shafts being a shift shaft defining an axial channel and having a plurality of gears disposed thereon;
a key slidably disposed in said axial channel and adapted to engage one of said gears; and
shifting means for axially moving said key within said axial channel and thereby selectively engaging one of said gears of said shift shaft;
said shift shaft comprising a first shaft portion, a second shaft portion, and means for axially connecting said first shaft portion and said second shaft portion, said bearing portion supporting said first shaft portion adjacent to said axially connecting means, said first shaft portion supporting said plurality of gears, said second shaft portion supporting said shifting means, said first shaft portion consisting essentially of a first material and said second shaft portion consisting essentially of a second material, said second material being less durable than said first material whereby the cost of said shift shaft is reduced.

17. The in-line transmission of claim 16 wherein said first material consists essentially of steel and said second material consists essentially of plastic.

18. The in-line transmission of claim 16 wherein said axially connecting means includes a recess in one of a proximal end of said first shaft portion and a proximal end of said second shaft portion, and a projection in the other of said first shaft portion proximal end and said second shaft portion proximal end, and said recess receives said projection whereby said first shaft portion and said second shaft portion are maintained in axial alignment.

19. The in-line transmission of claim 16 wherein said housing further includes second and third bearing portions receiving distal ends of said first shaft portion and said second shaft portion, respectively.

20. The in-line transmission of claim 16 wherein said key includes an elongate shaft connecting a head and a base portion, said key head is disposed in said axial channel within said first shaft portion, and said key base portion is disposed within said axial channel within said second shaft portion.

21. A transmission comprising:
 a housing;
 a plurality of shafts rotatably disposed within said housing, one of said shafts being a shift shaft defining an axial channel and having a plurality of gears disposed thereon;
 a key slidably disposed in said axial channel and adapted to engage one of said gears; and
 shifting means for axially moving said key within said axial channel and thereby selectively engaging one of said gears of said shift shaft;
 said shift shaft comprising a first shaft axial portion, a second shaft axial portion, and means for axially connecting proximal ends of said first shaft portion and said second shaft portion, said first shaft portion consisting essentially of a first material and supporting said plurality of gears, said second shaft portion consisting essentially of a second material and supporting said shifting means, said second material being less durable than said first material whereby the cost of said shift shaft is reduced,
 said axially connecting means including a centrally located recess in one of said first shaft portion proximal end and said second shaft portion proximal end, and a centrally located projection in the other of said first shaft portion proximal end and said second shaft portion proximal end, and said recess receiving said projection whereby said first shaft portion and said second shaft portion are maintained in axial alignment.

* * * * *